Patented May 28, 1929.

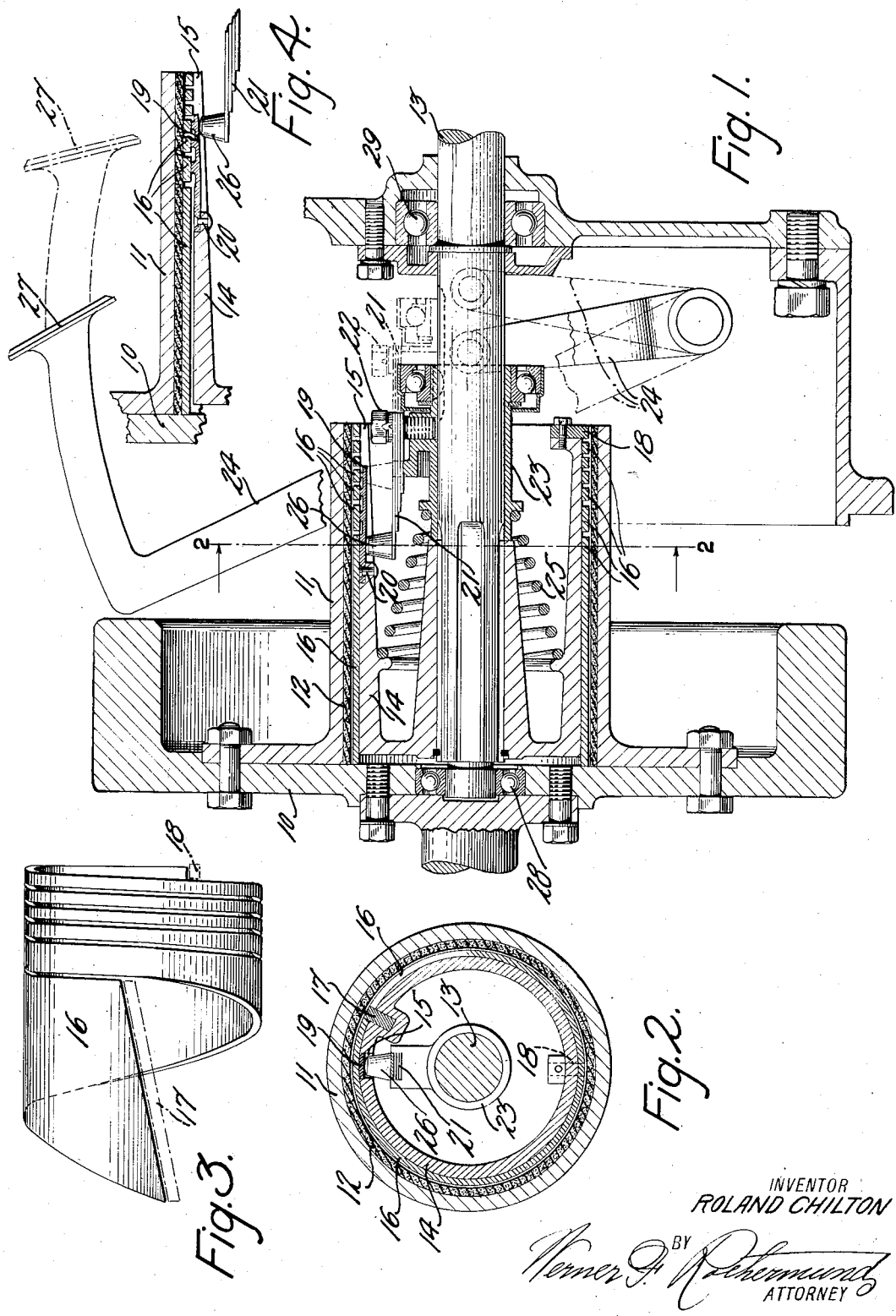

1,714,496

UNITED STATES PATENT OFFICE.

ROLAND CHILTON, OF KEYPORT, NEW JERSEY, ASSIGNOR TO HEALEY-AEROMARINE BUS COMPANY, INC., A CORPORATION OF NEW YORK.

FRICTIONAL ENGAGING MECHANISM.

Application filed January 25, 1927. Serial No. 163,426.

This invention relates to frictional engaging mechanisms and particularly features an improved means for imposing frictional restraint to relative motion between two co-axial members and accordingly applies equally well to both brakes and clutches.

One object of the invention is to provide a clutch wherein positive separation of the driving and driven surfaces is insured when the control is moved to the disengaged position for the purpose of avoiding the possibility of "drag" due to accidental contact of the friction surfaces.

Another object of the invention is to provide a new and improved coil clutch having control means whereby the engagement may be made in a progressive and sensitive manner.

Another object is to provide a "servo" type clutch or brake mechanism wherein the degree of self-actuation shall be controllable and to provide such a mechanism wherein friction producing pressure is derived from the load transmitted in controllable ratio thereto; and one wherein the engagement and disengagement may be effected by such control of the degree of self-action.

Another object is to provide a clutch wherein the driven member has a relatively small flywheel effect.

It is a well-known characteristic of coil friction bands that the ratio of tensions in successive coils builds up very rapidly with the number of coils in action for which reason, when the direction of rotation tends to wrap a coil of several turns against a drum, very slight applying pressure at one end produces very great tension, and therefore, frictional effect at the other with the result that such clutches are apt to be too sensitive to slight or incidental changes in the actuating pressure.

In the present invention on the other hand, the control means varies the number of turns subject to wrapping action from the applying pressure which may accordingly be of pre-determined amount.

In the drawings:—

Figure 1 is a vertical longitudinal section of the present invention embodied in a clutch which is shown in a disengaged position.

Figure 2 is a cross section taken on the line 2—2 of Fig. 1 as looking in the direction indicated by the arrows.

Figure 3 is a perspective view in detail of the coil band.

Figure 4 is a fragmentary view illustrating the moved position of some of the principal parts shown in Fig. 1.

In the present instance, 10 designates a driving member provided with a drum 11, preferably faced on the inside with friction material 12.

Secured to a shaft 13 and concentrically disposed within the drum 11, is a driven drum 14, provided with a longitudinal slot 15.

In close contact with the drum 14 there is mounted a coil 16, preferably formed tapered as shown in Fig. 3 so as to give increased friction area at the high pressure end, said drum being provided with abutments 17 and 18 disposed adjacent the ends of the coil and sufficiently spaced therefrom to permit distortion of the coil into contact with the driving drum 11, which is of such internal diameter as to be completely out of contact with the coil when the same is in its contracted condition.

Secured to the drum 14 so as to extend into the slot 15 and beneath the coil, is a flexible finger 19 anchored at 20 and provided with slightly raised portions adapted to individually contact with several successive convolutions of the coil. A control means comprises a preset spring 21, the tension of which can be altered by means of a set screw 22 which secures the spring to an axially slidable sleeve 23 mounted on the shaft 13 and adapted to be moved in one direction by a lever 24 and returned by a spring 25.

At the extreme end of the spring 21 there is mounted a button 26 by means of which the spring pressure is made effective upon the underside of the finger 19, said pressure being resisted by the anchorage 20 when the contact is at the root of the finger 19, as shown by the full lines of Fig. 1.

As the control means is moved away from the position shown in Fig. 1 to a position such as shown in Fig. 4, the spring pressure becomes effective upon the coil convolution located above the button 26 thus expanding that portion of the coil into frictional contact with the driving drum 11 which tends to rotate the coil towards the abutment 17 against which it will be forced due to the relative rotation of the drums 11 and 14. This will result in the expansion of all of that portion of the coil disposed between the abutment 17 and the location of spring pressure, bringing it into frictional driving contact with the drum 11; the multiplications of the friction effect from the spring means depending upon the number of coils between the abutment 17 and the point to which the spring pressure has been moved, according to the well-known characteristic of spring coils. The spring pressure may be moved axially from coil to coil as shown. It will be seen that the convolutions of the coil 16 have been carried beyond the finger 19 to the second abutment 18 so that the clutch may be adapted to resist reversed driving action as from over-run of the driven member.

In the case of a clutch operated as by a pedal 27 and which is to be fully engaged with the pedal pressure released, the axial spring 25 normally keeps the control spring contact at the free end of the finger. By an adjustable stop which may be introduced on the control means, the maximum number of coils giving self-wrapping action in the fully engaged position can be varied.

It will be noted that the flexible finger 19 has been cut away to form the raised portions herein before mentioned so as to present a single point of contact to each coil and it is obvious that as the control spring means is moved, pressure will be progressively transferred from one coil to the next. It will also be seen that when the control button 26 is at the base of the finger all the coils will contract and concentrically engage the driven drum. The drum 14 is held concentric with the drum 11 by suitable bearings 28, 29 so that very small clearances will be sufficient to insure complete freedom from "drag" between the driving and driven members in disengaged position.

Due to these fine clearances the radial movement of the finger 19 and hence the operating deflection of the spring means 21 will be very slight and the resistance to the control movement will be confined principally to the slight frictional resistance to sliding developed by this pressure.

The ratio of tensions in coil bands builds up very rapidly with the number of turns; for instance, with a co-efficient of friction of 1/3 the ratio of tensions is 8.1 for one turn and 4350 for four turns, and the frictional effect from the spring pressure will be changed in like ratio in moving the pressure of the spring means from one turn away from the abutment to four turns away, although no increased resistance to the control movement is developed. Thus very great friction effect will be obtained from very slight spring pressure and still smaller actuating pressure.

It should be understood that the present invention disclosing a structure in which frictional engagement is progressively engendered to transmit drive between two members such as a clutch, is not restricted in its application solely to a driving mechanism, but that the same principle and the same structure can in its broad aspect be employed equally well to restrain relative rotative motion between two members as in a brake.

Variations may be resorted to within the scope of the invention and portions of the improvements may be used without the others, whilst not departing from the spirit of the invention.

Having thus described my invention, I claim:—

1. In a frictional engaging mechanism, the combination of a drum, a friction coil having convolutions of varying widths, a driven member having oppositely disposed driving abutments adapted to be engaged with the ends of the coil and adapted to permit the expansion of all or part of said coil against the drum, and means for controlling the amount of coil so expanded.

2. In a frictional engaging mechanism, the combination of a drum, a coil having tapered convolutions forming a wide and a narrow end to the coil, a member having a forward driving abutment with one end of the coil and a backward driving abutment with the other end whereby the coil when locally pressed against the drum intermediate its ends will have an engaging wrapping action thereagainst over the length of coil in action between said pressure and the driving abutment, and control means to vary said length at will.

3. In apparatus of the class described, the combination of, a driving drum, a driven drum disposed concentrically therewith, a flexible coil formed of a plurality of turns wound upon the driven drum, abutments on the driven drum to engage the ends of the coil, an axially shiftable means adapted to selectively press one or more of said turns into frictional driving contact with the driving drum so as to radially expand that portion of the coil disposed between one of said abutments and the portion to which the pressure is applied.

4. In a frictional driving mechanism, the combination of driving and driven members in concentric relation, a cylindrical friction coil disposed in close contact with one of said members and adapted for radial distortion into frictional driving contact with the other of said members, means to engage the ends of the coil and adapted to prevent relative rotative motion between said coil and its contacting member, a flexible means extending longitudinally of the coil and adapted to have contact with several convolutions thereof, and a selective operating means contacting with the last said means and adapted to cause a radial distortion of one or more convolutions of said coil as desired.

5. In a frictional engaging mechanism, the combination of a driving drum, a driven drum, a coil of several convolutions anchored to the driven drum for rotation therewith and adapted for expansion into frictional engagement with the driving drum, means including the driven drum for positively centering the coil in slight predetermined clearance from the driving drum, and selective means adapted to expand one or more of the coil convolutions.

6. In a frictional engaging mechanism, the combination of a cylindrical driving member, a driven member, a coil mounted upon the driven member and adapted for expansion into frictional driving contact with the driving member, expansion pressure means movable from coil to coil, and flexible bridge means having a single point of contact with each coil and adapted to insure a gradual transference of the pressure from one coil to the next as said pressure means is moved.

7. In a frictional engaging mechanism, the combination of a cylindrical driving member, a driven member, a coil mounted upon the driven member and adapted for expansion into frictional driving contact with the driving member, expansion pressure means movable along the coil, and means coacting with said pressure means to prevent a sudden transfer of pressure from one coil to the next during such movement.

Signed at Keyport, in the county of Monmouth, and State of New Jersey this 22nd day of January A. D. 1927.

ROLAND CHILTON.